(12) United States Patent
Dodds-Brown et al.

(10) Patent No.: US 10,445,731 B1
(45) Date of Patent: Oct. 15, 2019

(54) MERCHANT RECEIPT OF A FIRST PORTION OF AN ACCOUNT NUMBER FROM AN ISSUER AND A SECOND PORTION FROM A CONSUMER

(71) Applicant: AMERICAN EXPRESS TRAVEL RELATED SERVICES COMPANY, INC, New York, NY (US)

(72) Inventors: Sarah C. Dodds-Brown, New Rochelle, NY (US); Anwesa Paul, Maplewood, NJ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 1339 days.

(21) Appl. No.: 14/570,831

(22) Filed: Dec. 15, 2014

(51) Int. Cl.
*G06Q 20/40* (2012.01)

(52) U.S. Cl.
CPC .................... *G06Q 20/40* (2013.01)

(58) Field of Classification Search
USPC .......................................... 235/383
See application file for complete search history.

(56) References Cited

U.S. PATENT DOCUMENTS

| | | | |
|---|---|---|---|
| 2012/0101881 A1* | 4/2012 | Taylor | G06Q 20/12 705/14.13 |
| 2014/0040001 A1* | 2/2014 | Harvey | G06Q 10/00 705/14.26 |

* cited by examiner

*Primary Examiner* — Toan C Ly
(74) *Attorney, Agent, or Firm* — Snell & Wilmer, L.L.P.

(57) ABSTRACT

The system facilitates the transmission of account numbers between transaction account issuers, merchants, and consumers. A transaction account issuer may transmit a portion of an account number to a merchant. A consumer may transmit the remainder of the account number to the merchant. The merchant may combine the portion of the account number received from the transaction account issuer and the remainder received from the consumer. The transaction account issuer may transmit the full account number to the merchant in a usable format. The merchant may transmit an authorization request for a transaction to the transaction account issuer including the full account number.

20 Claims, 6 Drawing Sheets

US 10,445,731 B1

MERCHANT RECEIPT OF A FIRST PORTION OF AN ACCOUNT NUMBER FROM AN ISSUER AND A SECOND PORTION FROM A CONSUMER

FIELD

The present disclosure relates to systems and methods for managing account numbers, and more specifically, to systems and methods for transmitting account numbers between entities.

BACKGROUND

On-line transactions allow consumers to make purchases from merchants via a computer or smartphone. In order to complete a transaction, the consumer may provide information to the merchant, such as an account number, expiration date, address, etc. There is a growing trend for transaction account issuers and merchants to collaborate to enhance the on-line experience for consumers. It may be beneficial in certain circumstances for a transaction account issuer to transmit a consumer's account number to a merchant. However, privacy concerns or government regulations may prevent the transaction account issuer from transmitting the account number to the merchant.

SUMMARY

Computer-based systems, computer programs, and computer-implemented methods may include transmitting a portion of an account number to a merchant. A consumer may transmit a remainder of the account number to the merchant. An authorization request comprising the account number may be received from the merchant.

In various embodiments, the account number may comprise fifteen digits, and the portion of the account number may consist of between two and fourteen of the fifteen digits. The account number may comprise sixteen digits, and the portion of the account number may consist of between two and fifteen of the sixteen digits.

The method may include prompting the consumer to enter the remainder of the account number. The method may also include receiving an application for a transaction account from the consumer and displaying the account number to the consumer. The method may further include displaying a merchant benefit to the consumer and receiving a selection to enroll in the merchant benefit. The method may further include prompting the consumer to set a transaction account as a default transaction account with the merchant and instructing the merchant to set the transaction account as the default transaction account. The method may also include transmitting an expiration date and security code to the merchant.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of exemplary embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems, methods and computer readable media for transmitting partial account numbers are disclosed. For various reasons, it may be undesirable for a transaction account issuer to share an account number of an account holder with a merchant or other third-party service provider, such as a digital wallet provider, free shipping provider, or other party involved in a transaction (collectively "merchant"). The transaction account issuer may not wish to expose the account holder's full account number during transmission or to the merchant. Additionally, government regulations or industry standards may prevent transmission of an account number. However, it may facilitate a transaction for an account holder to have the transaction account issuer provide the account holder's information to a merchant to avoid the cumbersome process of creating an account or entering the account holder's complete information for every merchant.

Figure 1:
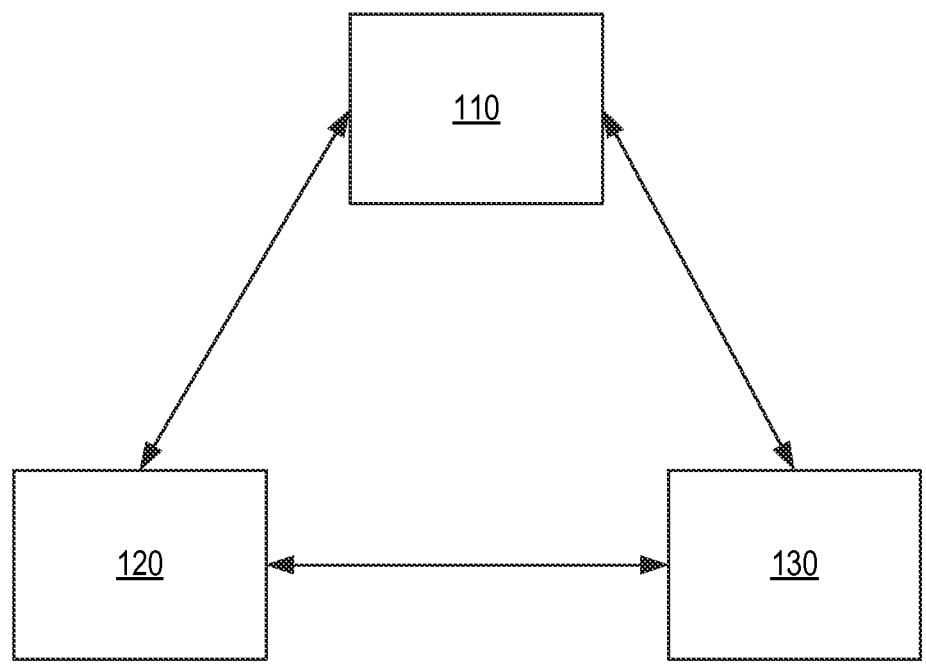
FIG. 1 illustrates a block diagram illustrating various system components of a system for transmitting an account number to a merchant, in accordance with various embodiments.

Referring to FIG. 1, a system 100 for transmitting an account number to a merchant is illustrated, according to various embodiments. System 100 may comprise a transaction account issuer ("TAI") 110, a merchant 120, and a consumer web client 130.

Phrases and terms similar to "transaction account issuer" or "financial institution" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Merchant 120 may comprise any person, entity, distributor system, software, and/or hardware that is a provider, broker and/or any other entity in the distribution chain of items. For example, a merchant may be a grocery store, a retail store, a travel agency, a service provider, a social media operator, an on-line merchant, a digital wallet provider, or the like. Phrases and terms similar to "business" or "merchant" may be used interchangeably with each other.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. In various embodiments, an account number may refer to a fifteen or sixteen digit number on a transaction instrument and a card security code on the transaction instrument. The account number may optionally be located on or associated with a rewards account, charge account, credit account, debit account, prepaid account, telephone card, embossed card, smart card, magnetic stripe card, bar code card, transponder, radio frequency card or an associated account.

A consumer may interact with the TAI 110 and merchant 120 via consumer web client 130. As used herein, the terms "consumer," "user," "end user," "customer," "cardmember," or "member" may be used interchangeably with each other, and each may include any person, entity, government organization, business, machine, hardware, and/or software.

The web client 130 may include any device (e.g., personal computer) which communicates via any network, for example such as those discussed herein. Web clients may include a browser application which interfaces with a network. Such browser applications comprise Internet browsing software installed within a computing unit or a system to conduct online transactions and/or communications. These computing units or systems may take the form of a computer or set of computers, although other types of computing units or systems may be used, including smartphones, laptops, notebooks, tablets, hand held computers, personal digital assistants, set-top boxes, workstations, computer-servers, main frame computers, mini-computers, PC servers, pervasive computers, network sets of computers, personal computers, such as iPads, iMACs, and MacBooks, kiosks, terminals, point of sale (POS) devices and/or terminals, televisions, or any other device capable of receiving data over a network. A web client may run Microsoft Internet Explorer®, Mozilla Firefox®, Google® Chrome, Apple® Safari, Apple® iOS, Android, or any other of the myriad software packages available for browsing the internet.

In various embodiments, the TAI 110 may transmit a portion of an account number of the consumer to the merchant 120. The portion of the account number may be any portion of the account number which, by itself, would be insufficient to complete a transaction with the merchant 120. In various embodiments, the portion of the account number may be the full account number without an associated card security code. In various embodiments, the portion of the account number may be the first ten digits of the account number, the first twelve digits of the account number, the last eight digits of the account number, or any other suitable portion of the account number. The portion of the account number may also be an encrypted portion, an algorithmic relationship to the portion, a translation of the portion, a scrambled representation of the portion, a code representing the portion, a graphic, visual, optical, machine readable and/or symbolic representation of the portion, and/or the like. In various embodiments, the TAI 110 may transmit the portion of the account number to the merchant 120 via a token gateway. The token gateway may transmit a token to the merchant 120 in place of the account number, and the merchant 120 may utilize the token in an authorization request transmitted to the TAI 110.

The merchant 120 may prompt the consumer for the remainder of the account number, and the consumer may transmit the remainder of the account number to the merchant 120 via consumer web client 130. The remainder of the account number may comprise the portion of the account number which was not transmitted to the merchant 120 by the TAI 110. The remainder of the account number may comprise any additional portion of the account number required to complete a transaction with the merchant 120. For example, for a fifteen digit account number, in which the TAI 110 transmits the first ten digits of the account number to the merchant 120, the remainder may comprise at least the last five digits of the account number. The merchant 120 may combine the portion of the account number from the TAI 110 and the remainder of the account number from the consumer and use the full account number to request authorization for a transaction from the TAI 110.

Figure 2:
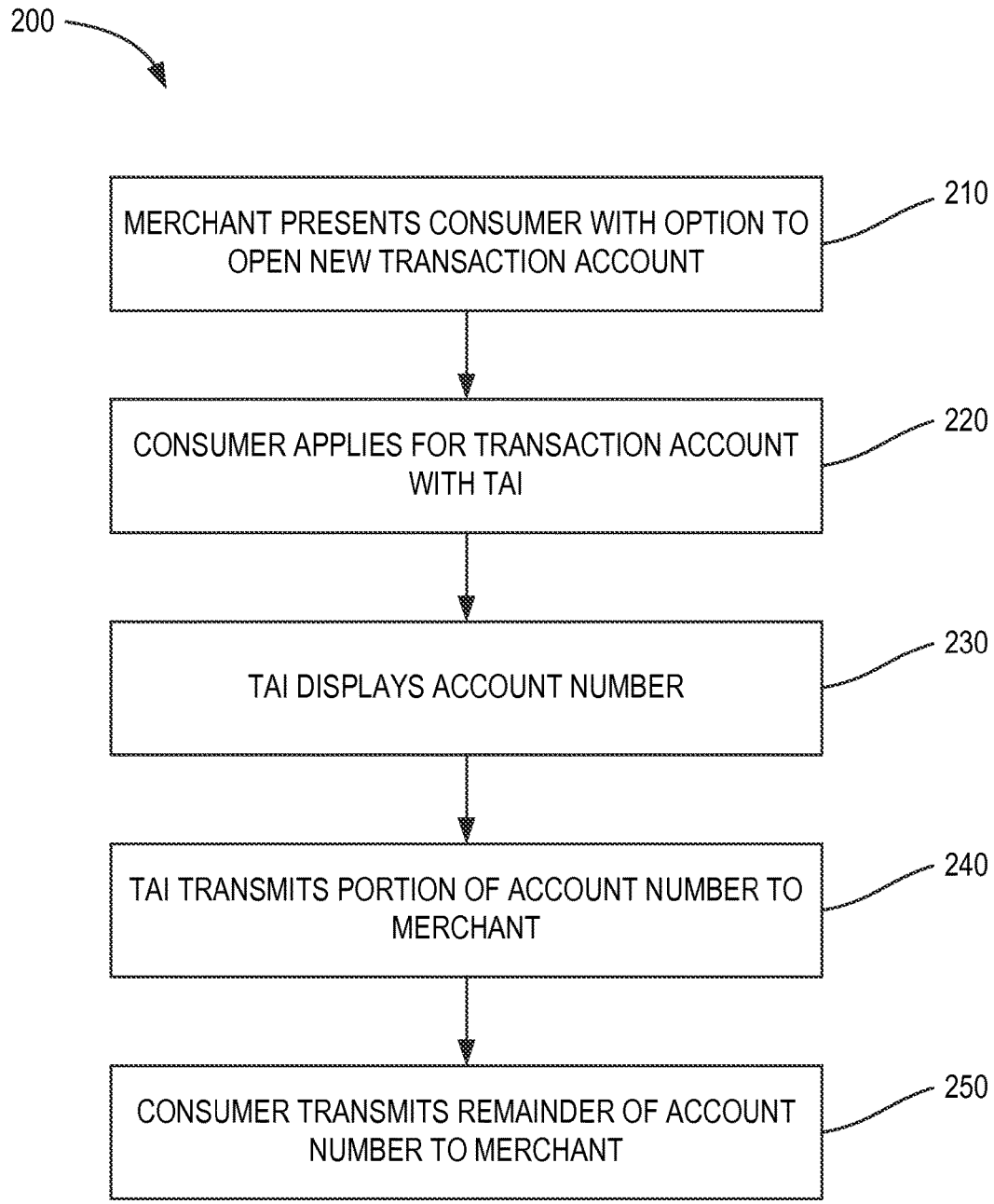
FIG. 2 illustrates a process flow for opening a transaction account, in accordance with various embodiments.

Referring to FIG. 2, a process 200 for opening a transaction account is illustrated according to various embodiments. A consumer may be interacting with a merchant website or application. The merchant may present the consumer with the option to open a new transaction account with a transaction account issuer to pay for a transaction (step 210). In various embodiments, the merchant or TAI may provide the consumer with a reward, such as a rebate or discount, for opening the transaction account or completing a transaction with the transaction account.

In response to the consumer selecting the offer to open the transaction account, the consumer may be directed to an application for the transaction account. In various embodiments, the application may be displayed in an iframe within the merchant website. The application may be displayed in a pop-up window. The consumer may enter standard information to apply for the transaction account, such as name, address, phone number, employer information, salary, financial assets, date of birth, email address, etc. (step 220).

The TAI may receive the application and determine whether the consumer qualifies for a transaction account. In response to the consumer qualifying for a transaction account, the TAI may transmit an approval message to the consumer. The TAI may present the consumer with an option to receive the transaction account number immediately. In response to the consumer opting to receive the transaction account number immediately, the TAI may display the transaction account number, expiration date, and security code (e.g. CVV, CID) (step 230).

The TAI may present the consumer with an option for the TAI to transmit the account number directly to the merchant in order to complete the transaction. The consumer may request that the TAI transmit the account number to the merchant. The TAI may transmit a portion of the account number to the merchant (step 240). In various embodiments, the TAI may transmit the first 10 or 12 digits of the account number to the merchant. The TAI may transmit additional information in order to complete the transaction, such as the expiration date, security code, name on card, address, etc. The merchant system may be configured to accept the partial account code.

The system may use iframe technology/methods, APIs, pop-up windows, etc. to request information, transmit information, switch between websites, etc. The pop-up window may close, and the consumer may be returned to the merchant website with the information transmitted from the TAI to the merchant pre-populated in a checkout page for the transaction. As a result of the integration between the TAI and the merchant, the TAI may map the fields requested by the merchant and provide the information to complete the fields securely. The consumer may enter the remaining portion of the account number and transmit the remaining portion to the merchant (step 250). The merchant may combine the portion of the account number received from the TAI and the remaining portion of the account number received from the consumer into a full account number. In various embodiments, the merchant may transmit the remaining portion of the account number to the TAI, the TAI may verify that the remaining portion of the account number is accurate, and the TAI may transmit the full account number to the merchant in the standard form. In various embodiments, the merchant may decode, apply an algorithm, convert or interpret the TAI portion and/or the remaining portion, in response to the TAI portion and/or the remaining portion being sent or received in a non-standard format. The merchant may transmit an authorization request to the TAI including the full account number and complete the transaction according to business as usual ("BAU") procedures.

Figure 3:
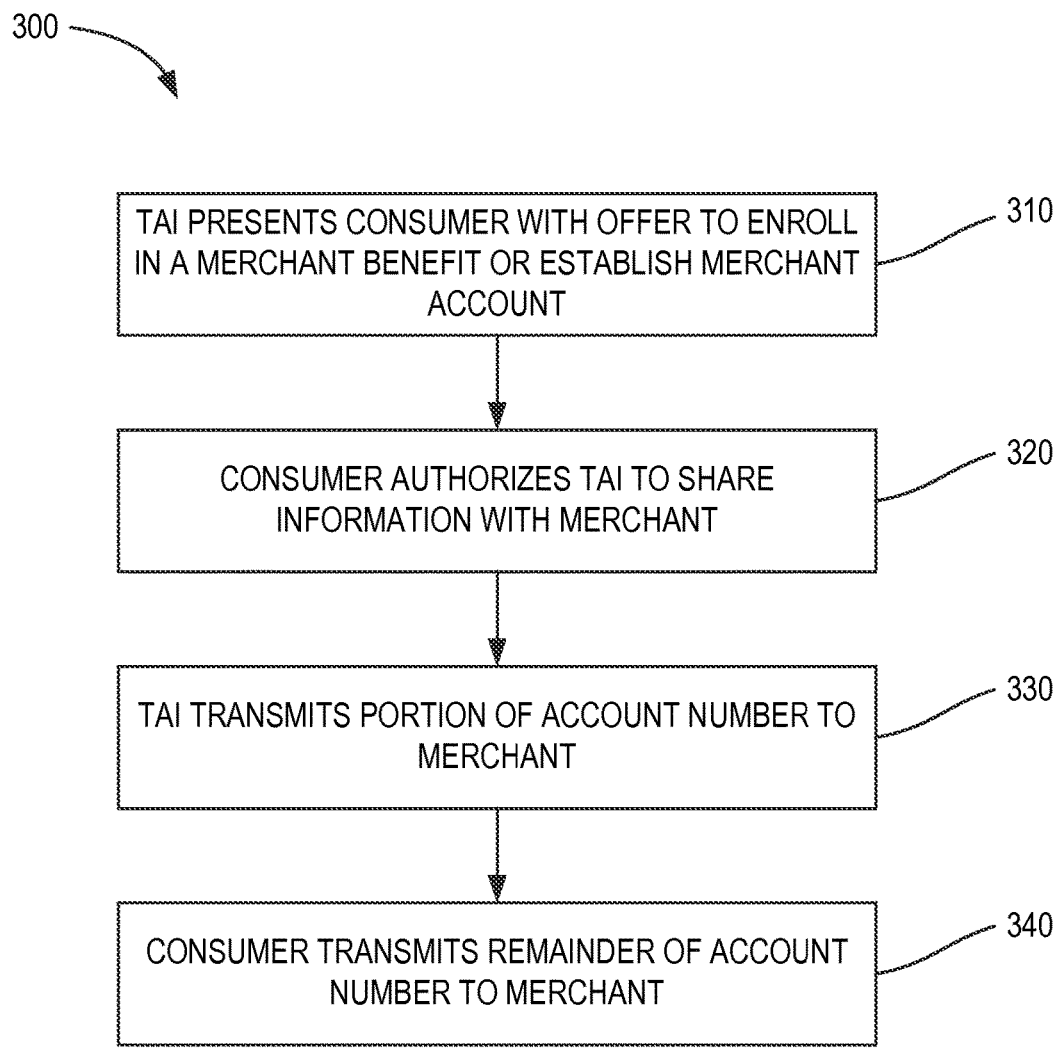
FIG. 3 illustrates a process flow for registering a consumer for a merchant benefit, in accordance with various embodiments.

Referring to FIG. 3, a process 300 for registering a consumer for a merchant benefit according to various embodiments. A consumer may have a transaction account with a TAI. The TAI may present the consumer with an offer to enroll in a merchant benefit or establish a merchant account on an account page for the consumer (step 310). In various embodiments, the merchant benefit may include a free or discounted membership with the merchant, or a discount on merchant goods or services. The consumer may authorize the TAI to share the account number and other personally identifiable information with the merchant (step 320). The TAI may transmit a first portion of the account number, the expiration date, the consumer's name, email address, and address to the merchant (step 330). In various embodiments, the merchant may prompt the consumer to enter the remainder of the account number. The consumer may transmit the remainder of the account number to the merchant (step 340). The merchant may transmit the remainder of the account number to the TAI for verification, and/or indicate to the TAI that the consumer has provided the remainder of the account number to the merchant. The TAI may then transmit the full account number to the merchant in a usable format. However, in various embodiments, the TAI may prompt the consumer to type in the remainder of the account number. The TAI may confirm that the remainder of the account number is accurate, and the TAI may transmit the remainder of the account number to the merchant. The consumer may enter a username and/or password with the merchant website in order to complete enrollment of the merchant benefit.

Figure 4:
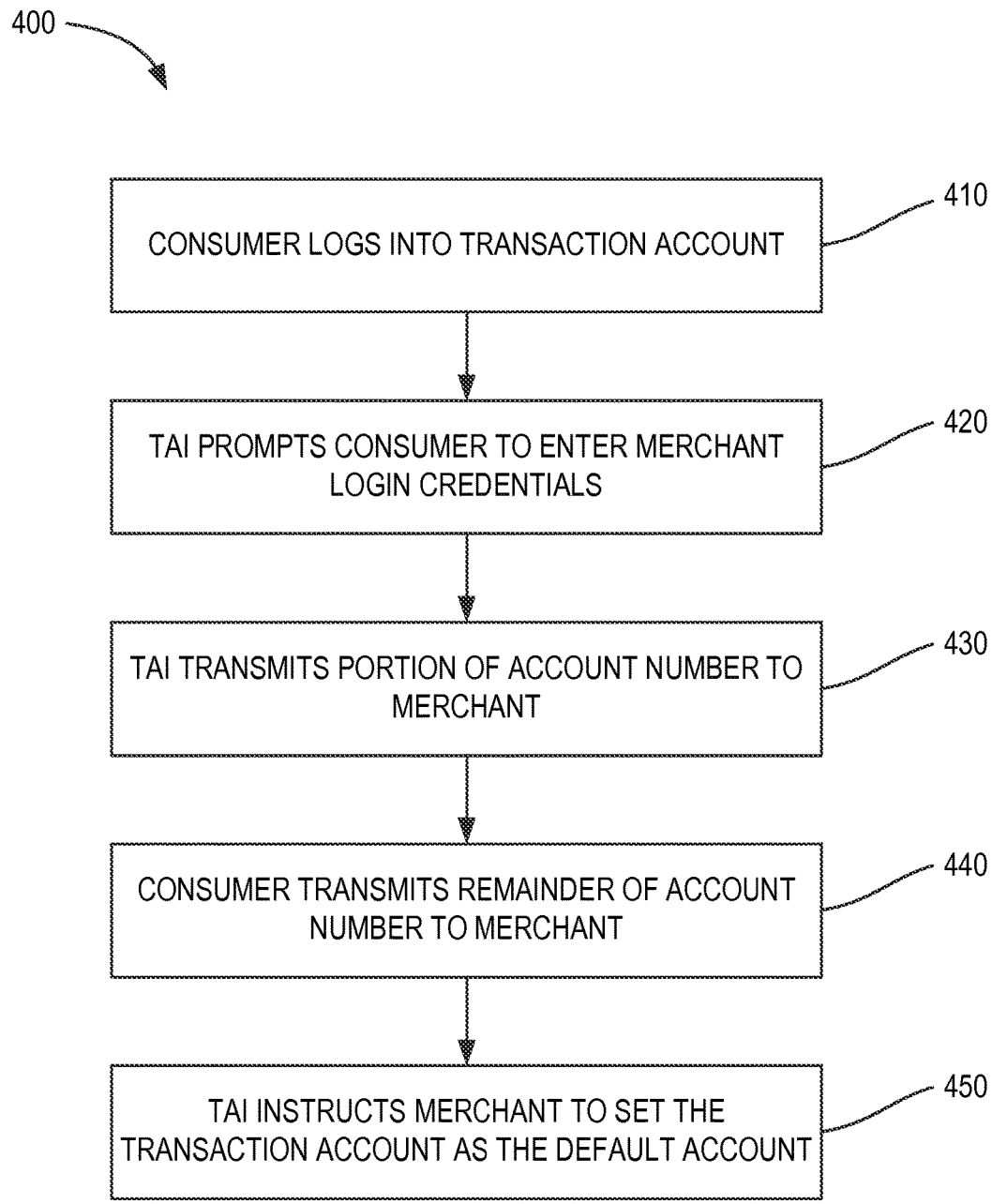
FIG. 4 illustrates a process flow for setting a transaction account as a default account, in accordance with various embodiments.

Referring to FIG. 4, a process 400 for setting a transaction account as a default account is illustrated, according to various embodiments. A consumer may login into an account page for a transaction account with a TAI (step 410). The TAI may present the consumer with the option to add transaction account information to various merchants. The TAI may also present the consumer with the option to set the transaction account as a default account with a merchant. In response to the consumer requesting for the TAI to transmit transaction account information to the merchant, at least one of the TAI or the merchant may prompt the consumer to enter login credentials for a merchant account (step 420).

The user may enter the login credentials, and in response to the merchant verifying the login credentials, the TAI may transmit the transaction account information to the merchant. The TAI may transmit a first portion of the account number, the expiration date, the consumer's name, email address, and address to the merchant (step 430). In various embodiments, the consumer may be directed to the merchant website. The consumer may type in the remainder of the account number on the merchant website (step 440). The TAI may then transmit the full account number to the merchant. The merchant may store the account number in association with the merchant account. The TAI may instruct the merchant to set the transaction account as the default transaction account for transactions between the consumer and the merchant (step 450). For any future transactions with the merchant, the merchant may prepopulate the consumer's stored transaction account information in order to complete the transaction.

Figure 5:
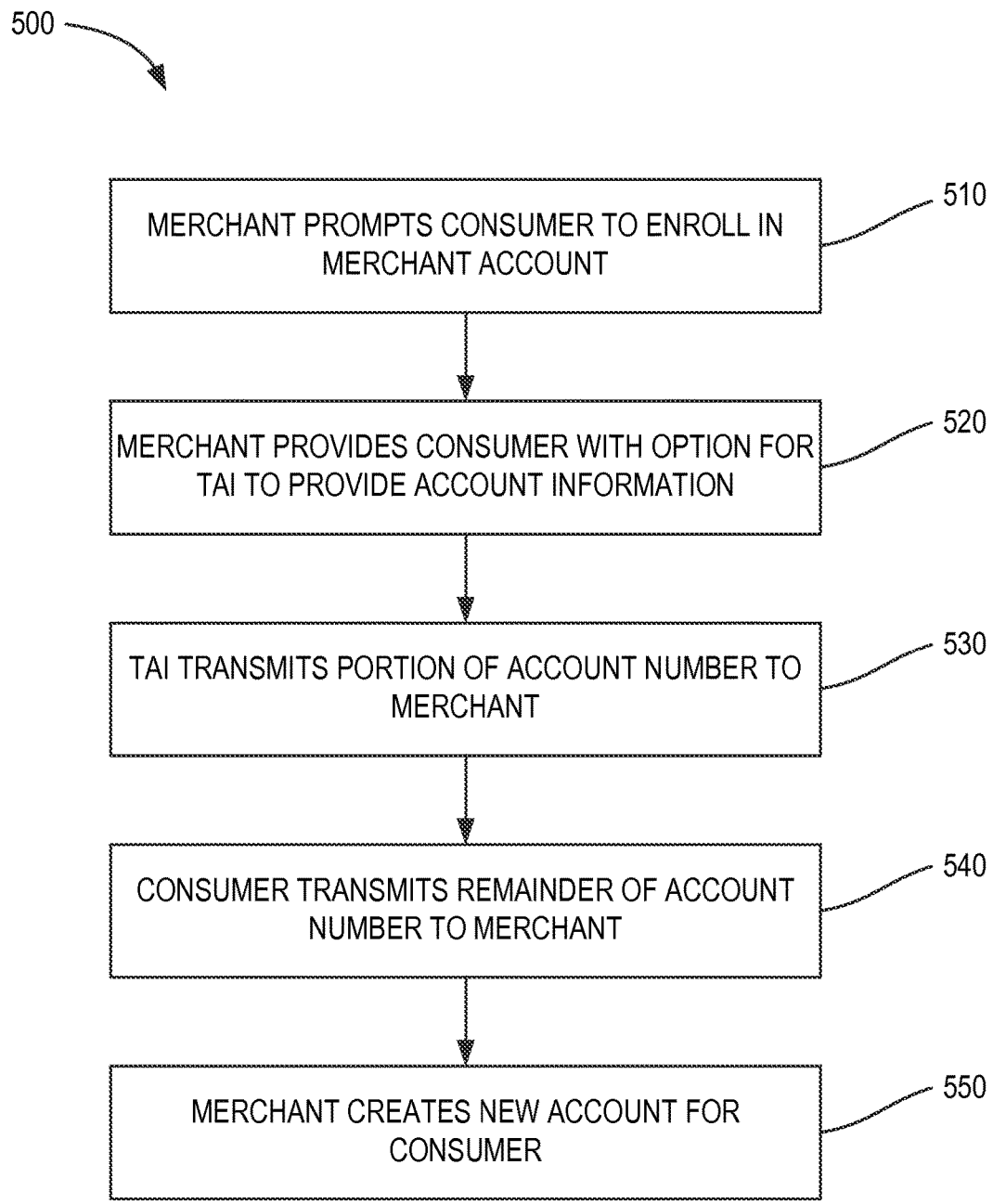
FIG. 5 illustrates a process flow for establishing a merchant account, in accordance with various embodiments.

Referring to FIG. 5, a process 500 for establishing a merchant account is illustrated according to various embodiments. A consumer may be prompted to enroll in a merchant account by a merchant (step 510). The merchant may provide the consumer with an option for transaction account information to be provided by a TAI (step 520). The consumer may select for the TAI to provide the transaction account information to the merchant, and the consumer may be prompted to provide TAI login credentials to the TAI. The consumer may login to the TAI, and submit a request to the TAI for the TAI to provide transaction account information to the merchant. The TAI may transmit a partial account number to the merchant (step 530). The consumer may be redirected to the merchant website. The consumer may submit the remainder of the account number to the merchant (step 540). The merchant may transmit the remainder of the account number to the TAI or indicate to the TAI that the merchant has received the remainder of the account number. The TAI may transmit the full account number to the merchant. The merchant may create a new account for the consumer and store the account number with the new account (step 550). In various embodiments, the TAI may instruct the merchant to set the transaction account as a default account.

Figure 6:
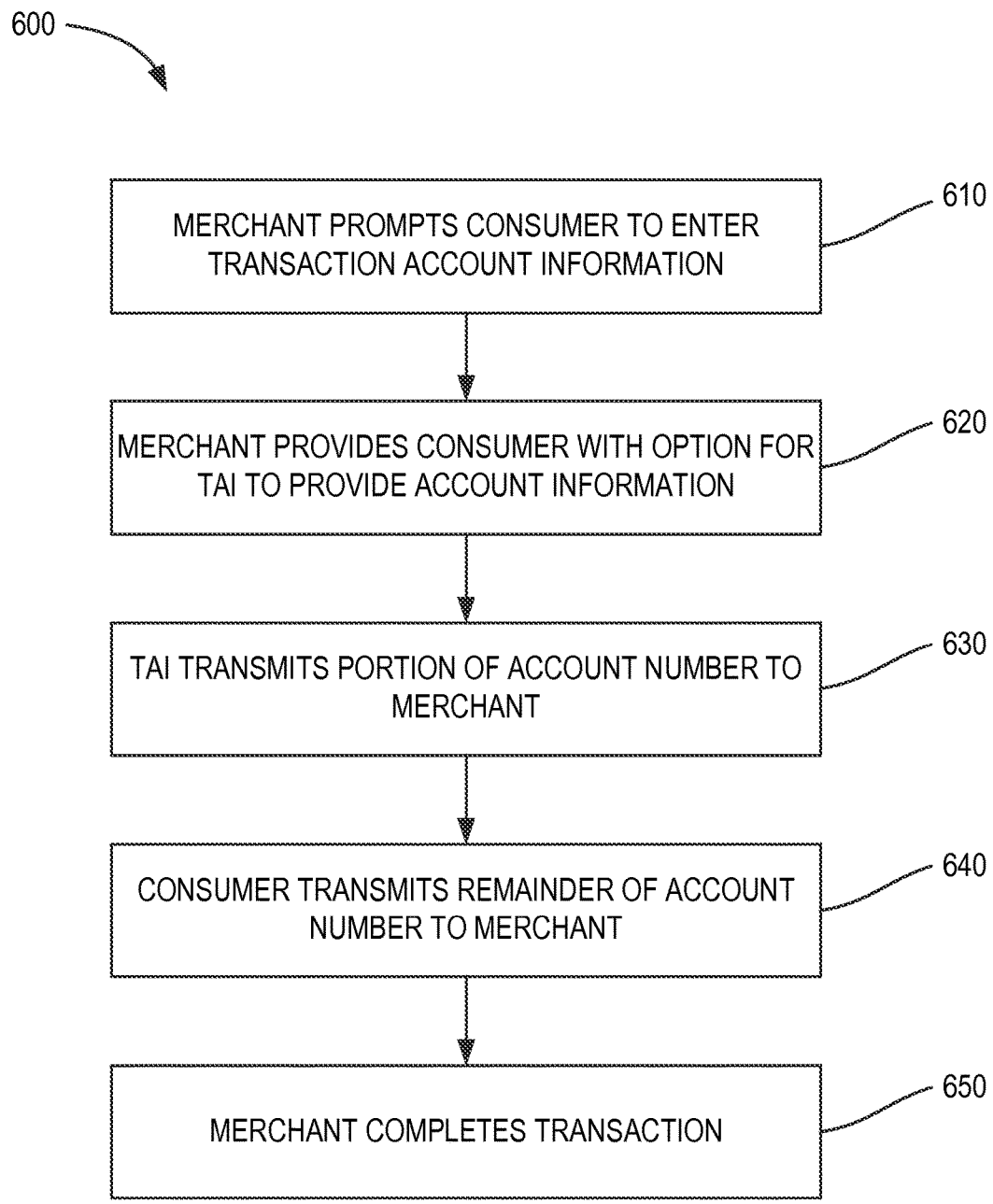
FIG. 6 illustrates a process flow for completing a transaction, in accordance with various embodiments.

Referring to FIG. 6, a process 600 for completing a transaction is illustrated according to various embodiments. A consumer may select an item or service to purchase from a merchant. The consumer may not have an account with the merchant, and the consumer may not wish to establish an account with the merchant. The merchant may prompt the consumer to enter transaction account information (step 610). The merchant may provide the consumer with an option to have a TAI provide the transaction account information (step 620). The consumer may select for the TAI to provide the transaction account information to the merchant, and the consumer may be prompted to provide TAI login credentials to the TAI. The consumer may login to the TAI, and submit a request to the TAI for the TAI to provide transaction account information to the merchant. The TAI may transmit a partial account number to the merchant (step 630). The consumer may be redirected to the merchant website. The consumer may submit the remainder of the account number to the merchant (step 640). The merchant may transmit the remainder of the account number to the TAI or indicate to the TAI that the merchant has received the remainder of the account number. The TAI may transmit the full account number to the merchant. The merchant may complete the transaction with the information received from the TAI (step 650).

While specific examples have been provided herein, those skilled in the art will appreciate that the present disclosure may include any instance in which a first portion of an account number is transmitted to a merchant by a first entity, and a second portion of the account number is transmitted to the merchant by a second entity.

Phrases similar to a "payment processor" may include a company (e.g., a third party) appointed (e.g., by a merchant) to handle transactions. A payment processor may include an issuer, acquirer, authorizer, network and/or any other system or entity involved in the transaction process, and/or at least a portion of the functions of such entities. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. In response to the payment processor receiving confirmation that the transaction account details have been verified, the information may be relayed back to the merchant, who will then complete the payment transaction. In response to the verification being denied, the payment processor relays the information to the merchant, who may then decline the transaction.

Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

The phrases consumer, customer, user, account holder, account affiliate, cardmember or the like shall include any person, entity, business, government organization, business, software, hardware, or machine associated with a transaction account, that buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

In various embodiments, a transaction account may include any account that may be used to facilitate a financial transaction including, for example, a charge account, a credit account, a bank account (e.g., a checking or savings account), a virtual currency account, and/or the like. The transaction account may include a transaction instrument such as a charge card, credit card, debit card, awards card, prepaid card, telephone card, smart card, magnetic stripe card, bar code card, transponder, radio frequency card and/or the like having an account number, which cardholders typically present to Service Establishments (SEs), as part of a transaction, such as a purchase. An "account number", as used herein, includes any device, code, number, letter, symbol, digital certificate, smart chip, digital signal, analog signal, biometric or other identifier/indicia suitably configured to allow the consumer to interact or communicate with the system, such as, for example, authorization/access code, personal identification number (PIN), Internet code, other identification code, and/or the like which is optionally located on card. The account number may be distributed and stored in any form of plastic, electronic, magnetic, radio frequency, wireless, audio and/or optical device capable of transmitting or downloading data from itself to a second device. A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type and etc. In this example, the last sixteenth digit is used as a sum check for the sixteen-digit number. The intermediary eight-to-ten digits are used to uniquely identify the customer.

In various embodiments, an account number may identify a consumer. In addition, in various embodiments, a consumer may be identified by a variety of identifiers, including, for example, an email address, a telephone number, a cookie id, a radio frequency identifier ("RFID"), a biometric, a card security code and the like.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies.

Phrases and terms similar to "transaction account" may include any account that may be used to facilitate a financial transaction.

Phrases and terms similar to "transaction" may include any purchase, exchange, lease, rental, deal, agreement, authorization, settlement, information exchange, item exchange, a record of charge (or "ROC"), record of transaction ("ROT"), including all related data and metadata, and/or the like. Moreover, the transaction, information associated with the transaction, and/or a record associated with the transaction may comprise a unique identifier associated with a transaction. A transaction may, in various embodiments, be performed by one or more account holders using a transaction account. The transaction account may be associated with a transaction instrument such as, for example, a gift card, a debit card, a credit card, and the like. A record associated with the transaction may, in addition, contain details such as location, merchant name or identifier, transaction amount, transaction date, account number, account security pin or code, account expiry date, and the like for the transaction.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

The present system or any part(s) or function(s) thereof may be implemented using hardware, software or a combination thereof and may be implemented in one or more computer systems or other processing systems. However, the manipulations performed by embodiments were often referred to in terms, such as determining or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In various embodiments, the embodiments are directed toward one or more computer systems capable of carrying out the functionality described herein. The computer system includes one or more processors. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows operating system, UNIX®, Linux®, Solaris®, MacOS, etc.) as well as various conventional support software and drivers typically associated with computers.

Computer system also includes a main memory, such as random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In an exemplary embodiment, access is through a network or the Internet through a commercially-available web-browser software package.

In various embodiments, components, modules, and/or engines of systems may be implemented as micro-applications or micro-apps. Micro-apps are typically deployed in the context of a mobile operating system, including for example, a Palm® mobile operating system, a Windows® mobile operating system, an Android® Operating System, Apple® iOS, a Blackberry® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Phrases and terms similar to an "item" may include any good, service, information, experience, data, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

Phrases and terms similar to "transaction" may include any purchase, authorization, settlement, a record of charge (or "ROC"), record of transaction ("ROT") and/or the like. Moreover, the transaction, information associated with the transaction, and/or a record associated with the transaction may comprise a unique identifier associated with a transaction. A transaction may, in various embodiments, be performed by a one or more members using a transaction account, such as a transaction account associated with a transaction account such as, for example, a gift card, a debit card, a credit card, and the like. A record associated with the transaction may, in addition, contain details such as location, merchant name or identifier, transaction amount, transaction date, account number, account security pin or code, account expiry date, and the like for the transaction.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PM, GPG (GnuPG), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQ™ (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

In various embodiments, the terms "end user", "consumer", "customer", "cardmember", "business", "merchant", or "member" may be used interchangeably with each other, and each may include any person, entity, government organization, business, machine, hardware, and/or software. In various embodiments, the functions described with reference to these terms may be performed by any entity in system 100.

A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer may have a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network may be a closed network that is assumed to be secure from eavesdroppers. Exemplary transaction networks may include the American Express®, VisaNet® and the Veriphone® networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

Functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A computer-implemented method comprising:
   providing, by a transaction authorization computer-based system, a second portion of an account number to an account holder via a pop-up window;
   transmitting, by the transaction authorization computer-based system, a first portion of the account number to a merchant,
   wherein the account holder transmits the second portion of the account number to the merchant;
   transmitting, by the transaction authorization computer-based system, expiration date, security code and a name of the account holder to the merchant;
   receiving, by the transaction authorization computer-based system, an authorization request comprising the second portion of the account number from the merchant;
   confirming, by the transaction authorization computer-based system, that the second portion of the account number matches a stored second portion of the account number; and
   transmitting, by the transaction authorization computer-based system, a functional version of the account number comprising the first portion and the second portion to the merchant.

2. The method of claim 1, wherein the account number comprises fifteen digits, and wherein the first portion of the account number consists of between two and fourteen of the fifteen digits.

3. The method of claim 1, wherein the account number comprises sixteen digits, and wherein the first portion of the account number consists of between two and fifteen of the sixteen digits.

4. The method of claim 1, further comprising prompting, by the transaction authorization computer-based system, the account holder to enter the second portion of the account number.

5. The method of claim 1, further comprising:
   receiving, by the transaction authorization computer-based system, an application for a transaction account from the account holder; and
   displaying, by the transaction authorization computer-based system, the account number to the account holder.

6. The method of claim 1, further comprising:
   displaying, by the transaction authorization computer-based system, a merchant benefit to the account holder; and
   receiving, by the transaction authorization computer-based system, a selection to enroll in the merchant benefit or establish a merchant account.

7. The method of claim 1, further comprising:
   prompting, by the transaction authorization computer-based system, the account holder to set a transaction account as a default transaction account with the merchant; and
   instructing, by the transaction authorization computer-based system, the merchant to set the transaction account as the default transaction account.

8. The method of claim 1, further comprising transmitting, by the transaction authorization computer-based system, an expiration date and security code to the merchant.

9. The method of claim 1, further comprising transmitting, by the transaction authorization computer-based system, an address of the account holder to the merchant.

10. An article of manufacture including a non-transitory, tangible computer readable storage medium having instructions stored thereon that, in response to execution by a transaction authorization computer-based system, cause the computer-based system to perform operations comprising:
    providing, by the transaction authorization computer-based system, a second portion of an account number to an account holder via a pop-up window;
    transmitting, by the transaction authorization computer-based system, a first portion of the account number to a merchant,
    wherein the account holder transmits the second portion of the account number to the merchant;
    transmitting, by the transaction authorization computer-based system, expiration date, security code and a name of the account holder to the merchant;
    receiving, by the transaction authorization computer-based system, an authorization request comprising the second portion of the account number from the merchant;
    confirming, by the transaction authorization computer-based system, that the second portion of the account number matches a stored second portion of the account number; and
    transmitting, by the transaction authorization computer-based system, a functional version of the account number comprising the first portion and the second portion to the merchant.

11. The article of manufacture of claim 10, the operations further comprising prompting, by the transaction authorization computer-based system, the account holder to enter the second portion of the account number.

12. The article of manufacture of claim 10, further comprising:
receiving, by the transaction authorization computer-based system, an application for a transaction account from the account holder; and
displaying, by the transaction authorization computer-based system, the account number to the account holder.

13. The article of manufacture of claim 10, further comprising:
displaying, by the transaction authorization computer-based system, a merchant benefit to the account holder; and
receiving, by the transaction authorization computer-based system, a selection to enroll in the merchant benefit or establish a merchant account.

14. The article of manufacture of claim 10, the operations further comprising:
prompting, by the transaction authorization computer-based system, the account holder to set a transaction account as a default transaction account with the merchant; and
instructing, by the transaction authorization computer-based system, the merchant to set the transaction account as the default transaction account.

15. The article of manufacture of claim 10, further comprising transmitting, by the transaction authorization computer-based system, an expiration date and security code to the merchant.

16. A transaction authorization system comprising:
a processor,
a tangible, non-transitory memory configured to communicate with the processor,
the tangible, non-transitory memory having instructions stored thereon that, in response to execution by the processor, cause the processor to perform operations comprising:
providing, by the processor, a second portion of an account number to an account holder via a pop-up window;
transmitting, by the processor, a first portion of the account number to a merchant,
wherein the account holder transmits the second portion of the account number to the merchant;
transmitting, by the processor, expiration date, security code and a name of the account holder to the merchant;
receiving, by the processor, an authorization request comprising the second portion of the account number from the merchant;
confirming, by the processor, that the second portion of the account number matches a stored second portion of the account number; and
transmitting, by the processor, a functional version of the account number comprising the first portion and the second portion to the merchant.

17. The system of claim 16, further comprising prompting, by the processor, the account holder to enter the second portion of the account number.

18. The system of claim 16, further comprising:
receiving, by the processor, an application for a transaction account from the account holder; and
displaying, by the processor, the account number to the account holder.

19. The system of claim 16, further comprising:
displaying, by the processor, a merchant benefit to the account holder; and
receiving, by the processor, a selection to enroll in the merchant benefit or establish a merchant account.

20. The system of claim 16, further comprising:
prompting, by the processor, the account holder to set a transaction account as a default transaction account with the merchant; and
instructing, by the processor, the merchant to set the transaction account as the default transaction account.

* * * * *